United States Patent
Sorar

(10) Patent No.: US 7,318,225 B1
(45) Date of Patent: Jan. 8, 2008

(54) OBJECT ORIENTED SOFTWARE ARCHITECTURE FOR SOFTWARE RECONFIGURABLE WIRELESS MODEM

(75) Inventor: Ertugrul Sorar, St. Louis, MO (US)

(73) Assignee: Novatel Wireless, Inc., San Diego, CA (US)

(*) Notice: Subject to any disclaimer, the term of this patent is extended or adjusted under 35 U.S.C. 154(b) by 901 days.

(21) Appl. No.: 09/961,508

(22) Filed: Sep. 21, 2001

(51) Int. Cl.
G06F 9/44 (2006.01)

(52) U.S. Cl. ............... 717/171; 717/106; 717/107; 717/108; 717/109

(58) Field of Classification Search ........ 717/168–178, 717/106–109, 71; 375/130, 222, 220, 25; 398/115; 710/5, 10, 31; 370/295; 707/103 R; 455/553.1; 709/227
See application file for complete search history.

(56) References Cited

U.S. PATENT DOCUMENTS

| | | | | |
|---|---|---|---|---|
| 5,712,977 A * | 1/1998 | Glad et al. ................ 710/10 |
| 5,889,816 A * | 3/1999 | Agrawal et al. .......... 375/220 |
| 5,940,438 A * | 8/1999 | Poon et al. ............... 375/222 |
| 6,069,879 A * | 5/2000 | Chatter .................... 370/295 |
| 6,085,198 A * | 7/2000 | Skinner et al. ......... 707/103 R |
| 6,286,060 B1 * | 9/2001 | DiGiorgio et al. ........ 710/31 |
| 6,307,877 B1 * | 10/2001 | Philips et al. ............ 375/130 |
| 6,377,815 B1 * | 4/2002 | Krishnan et al. ....... 455/553.1 |
| 6,501,576 B1 * | 12/2002 | Seacombe ................ 398/115 |
| 6,546,436 B1 * | 4/2003 | Fainmesser et al. ......... 710/5 |
| 6,631,414 B2 * | 10/2003 | Bullock et al. ........... 709/227 |
| 6,681,390 B2 * | 1/2004 | Fiske ....................... 717/173 |
| 6,697,421 B1 * | 2/2004 | Monroe et al. .......... 375/222 |
| 6,754,895 B1 * | 6/2004 | Bartel et al. ............. 717/171 |
| 6,765,967 B2 * | 7/2004 | Dowling .................. 375/254 |
| 6,779,177 B1 * | 8/2004 | Bahrs et al. ............. 717/173 |
| 6,802,061 B1 * | 10/2004 | Parthasarathy et al. ..... 717/173 |
| 6,842,803 B2 * | 1/2005 | Schmidt et al. ............. 710/69 |
| 6,915,513 B2 * | 7/2005 | Duesterwald et al. ....... 717/168 |
| 6,964,034 B1 * | 11/2005 | Snow ....................... 717/121 |
| 2002/0083432 A1 * | 6/2002 | Souissi et al. ............. 717/178 |
| 2002/0085528 A1 * | 7/2002 | Reza et al. ................. 370/338 |
| 2002/0184610 A1 * | 12/2002 | Chong et al. .............. 717/109 |
| 2003/0033525 A1 * | 2/2003 | Rajaram .................. 713/168 |
| 2003/0035471 A1 * | 2/2003 | Pitsoulakis .............. 375/222 |
| 2003/0066057 A1 * | 4/2003 | RuDusky .................. 717/140 |
| 2003/0118081 A1 * | 6/2003 | Philips et al. ............ 375/130 |
| 2004/0073901 A1 * | 4/2004 | Imamatsu ................ 717/170 |
| 2004/0093586 A1 * | 5/2004 | Brockway et al. ........ 717/108 |

(Continued)

OTHER PUBLICATIONS

Yoshida et al., Broadband RF Front-end and Software Execution Procedure in Software-defined Radio, 1999, IEEE, pp. 2133-2137.*

(Continued)

*Primary Examiner*—Wei Zhen
*Assistant Examiner*—Satish S Rampuria
(74) *Attorney, Agent, or Firm*—Foley & Lardner, LLP

(57) ABSTRACT

An abstract modem factory architecture and corresponding systems and methods are disclosed. This architecture and the corresponding systems and methods allow wireless modem control software for a wireless modem to be isolated from specific air interface implementation code. The use of polymorphism and dynamic binding at run time provides an interface for creating modem type without specifying concrete classes. The concrete classes remain responsible for creating the complete set of software modules specific to each modem type configuration.

16 Claims, 6 Drawing Sheets

U.S. PATENT DOCUMENTS

| | | | |
|---|---|---|---|
| 2004/0261072 A1* | 12/2004 | Herle | 717/171 |
| 2005/0044541 A1* | 2/2005 | Parthasarathy et al. | 717/173 |
| 2005/0071809 A1* | 3/2005 | Pulley | 717/108 |
| 2005/0149907 A1* | 7/2005 | Seitz et al. | 717/108 |
| 2006/0225030 A1* | 10/2006 | Deffler | 717/104 |

OTHER PUBLICATIONS

Park et al., Analysis of the Jointly Adaptin and Asynchronously Configured V.32 Modem Implementation, 1991, IEEE, pp. 683-688.*

Ruiz, On the hardware implementation of a Multi-Processor environment for several DSP applications, 1981, IEEE, pp. 681-684.*

Brown, A reconfigurable Modem for Increased Network Capacity and Video, Voice, and Data Transmission over GSM PCS, 1996, IEEE, pp. 215-224.*

Portable telephone for personal digital cellular system, Tokuhiro, N.; Murota, K.; Sasaki, A.; Kobayashi, K.; Nagata, K.; Chiba, K., Vehicular Technology Conference, 1993 IEEE 43rd, May 18-20, 1993, pp. 718-721, IEEE.*

A stream-based configurable computing radio testbed, Swanchara, S.; Harper, S.; Athanas, P., FPGAs for Custom Computing Machines, 1998. Proceedings. IEEE Symposium on, Apr. 15-17, 1998, pp. 40-47, IEEE.*

Configurable logic for digital communications: it's about time, Dick, C.; Harris, F., Signals, Systems, and Computers, 1999. Conference Record of the Thirty-Third Asilomar Conference on, vol. 1 1999, pp. 564-568 vol. 1, IEEE.*

On the hardware implementation of a multi-processor environment for several DSP applications, Ruiz, A., Acoustics, Speech, and Signal Processing, IEEE International Conference on ICASSP '81, vol. 6 Apr. 1981, pp. 681-684, IEEE.* www.google.com, Reconfigurable Modem Architecture and Its Abstraction in an End to End Reconfigurable Communication Network, Internet, pp. 1-9, Jan. 14, 2005; Accessed on Jun. 1, 2005.*

Turner et al., A wideband software reconfigurable modem, www.google.com, 1981, pp. 1-2.*

\* cited by examiner

OBJECT ORIENTED SOFTWARE ARCHITECTURE FOR SOFTWARE RECONFIGURABLE WIRELESS MODEM

BACKGROUND

1. Field of the Invention

This invention relates to wireless modems and, more particularly, software definable radio frequency (RF) wireless modems.

2. Description of Related Art

RF wireless modems are currently used in many portable devices, such as laptops, Personal Digital Assistants (PDAs), etc. Generally, these wireless modems are designed to transmit and receive data via a specific air interface. An air interface includes both a designated frequency band and a protocol for communication. Conventional wireless modems take advantage of this air-interface-specific design by implementing logic particular to the air interface, such as logic for protocol handling, in hardware. This creates faster and lower power modems, but at the cost of requiring the functionality of the modem to be fixed upon leaving the factory.

This drawback of conventional wireless modem design has been recognized in the industry, and many companies and standards groups are currently attempting to design software definable wireless modems. A software definable wireless modem would be capable of transmitting and receiving data over multiple air interfaces by reconfiguring its hardware as needed. In theory, software for a particular new air interface could be received by the device, such as by downloading it over a current air interface, allowing a user of the device to switch air interfaces as desired.

This potential flexibility in wireless modem communication would create a number of advantages. For example, the same portable device could be used when travelling to another part of the world, where an alternate air interface is preferable, without having to reserve space in memory for the software designed for the alternate air interface when not travelling. Additionally, alternate air interfaces could be used by the same device within the same locale at different times, depending on factors such as current cost of using a specific network and data rate needed for a particular task. However, in practice, designing this flexibility into a wireless modem has proven difficult.

In particular, the difficulty arises because a software definable modem will utilize hardware that is capable of transmitting and receiving over multiple frequency bands and using multiple protocols. Thus, most of the speed and power consumption characteristics, as well as the storage space requirements for the software, of a software definable modem are created by the manner of implementation in software. As more flexibility and generality are built into the software, the storage space requirements increase and the speed and power consumption characteristics generally worsen.

For example, some have suggested the use of a CORBA (Common Object Request Broker Architecture) type architecture to support both infrastructure and handheld devices for any type of communication configuration, including wireless configurations. However, CORBA is very complex because it attempts to make the network completely transparent by allowing execution of any class available on the network as if it is located on the local machine; CORBA writes all the interfaces between different machines. This complexity makes CORBA software excessively large, power consumptive, and greedy for processor cycles.

Therefore, what is needed is a software design approach for software definable wireless modems that provides as much flexibility as possible, while minimizing memory requirements, processor time and power consumption.

SUMMARY OF THE INVENTION

The present invention can be regarded, in one aspect, as a method for configuring a wireless modem having hardware that is capable of transmitting or receiving data via a plurality of air interface technologies. The method includes the steps of selecting a specific air interface from a set of at least two air interfaces and creating a modem factory object for the selected air interface using an abstract modem factory class. The method further includes the steps of generating a hardware configuration object for the selected air interface using the modem factory object, and configuring wireless modem hardware using the hardware configuration object via an interface defined by an abstract modem configuration class.

In various embodiments, the specific air interface may be selected by a user, by a service provider and/or by a set of instructions running in the background. The instructions may include instructions for periodically scanning received RF signals for available air interfaces and selecting a preferred air interface from those available. The preference for an air interface may be based upon a number of factors, including cost of a particular air interface service and data rate requirements for a current or imminent user activity.

Additionally, in one embodiment, storage space is saved by not requiring all libraries defining all the air interface subclasses to be stored all the time. In this embodiment, in one aspect, the method further includes the steps of checking a memory for a library corresponding to the selected air interface, requesting the library via a network if the library is not found in the memory, and continuing with a current air interface configuration if the requested library is not successfully downloaded.

In other aspects, the present invention can be regarded as a computer readable medium and as a computer system for configuring the hardware of a wireless modem.

Further features and advantages of the invention as well as the structure and operation of various embodiments of the invention are described in detail below with reference to the accompanying drawings.

BRIEF DESCRIPTION OF THE FIGURES

Preferred embodiments are illustrated by way of example, and not by way of limitation, in the figures of the accompanying drawings, in which like reference numerals refer to like components, and in which.

DETAILED DESCRIPTION OF THE INVENTION

The present invention is directed toward an RF modem employing an object oriented architecture for software reconfiguration to communicate using multiple air interfaces. The following description is of various embodiments of the invention and the best mode presently contemplated for practicing the invention. This description is not to be taken in a limiting sense but is made merely for the purpose of describing the general principles of the invention. The scope of the invention should be ascertained with reference to the issued claims.

For ease in illustration, aspects and features of the invention are disclosed and described herein in terms of a software reconfigurable modem using one or more air interfaces selected from a group including Cellular Digital Packet Data (CDPD), General Packet Radio System (GPRS), and Ricochet. However, after reading this description, it will be apparent to those skilled in the relevant art(s) that the invention may be implemented in alternative embodiments. For example, alternative embodiments include a software reconfigurable modem using one or more air interfaces selected from a group including Global System for Mobile Communications (GSM), code-division multiple access (CDMA), wideband code-division multiple access (W-CDMA), Universal Mobile Telecommunications System (UMTS), and Bluetooth.

Figure 1:
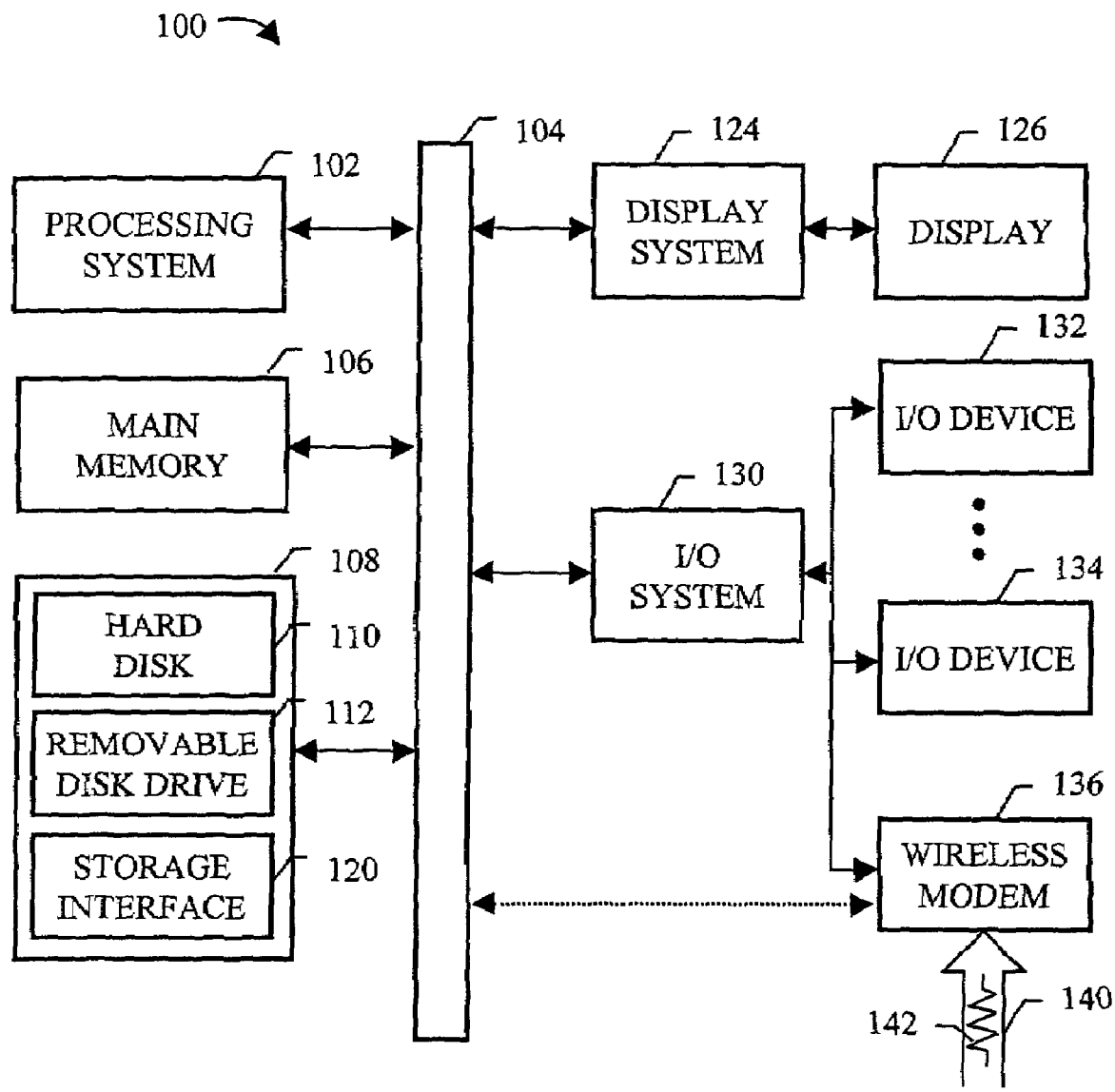
FIG. 1 is a block diagram illustrating an example computer system in which elements and functionality of the invention are implemented according to one embodiment.

FIG. 1 is a block diagram illustrating an example computer system in which elements and functionality of the invention are implemented according to one embodiment. After reading this description, it will become apparent to a person having ordinary skill in the relevant art(s) how to implement the invention using other computer systems and/or computer architectures. Referring now to FIG. 1, an exemplary computer system 100 is shown.

The computer system 100 includes a processing system 102, which controls the computer system 100. The processing system 102 includes a central processing unit such as a microprocessor or microcontroller for executing programs, performing data manipulations and controlling tasks in the computer system 100. Moreover, in alternative embodiments, the processing system 102 includes one or more additional processors.

Such additional processors include an auxiliary processor to manage input/output, an auxiliary processor to perform floating point mathematical operations, a digital signal processor (DSP) (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized by those skilled in the relevant art(s) that these additional processors may be discrete processors or may be built in to the central processing unit.

The processing system 102 is coupled with a communication bus 104. The communication bus 104 includes a data channel for facilitating information transfer between storage and other peripheral components of the computer system 100. The communication bus 104 provides the set of signals required for communication with the processing system 102, including a data bus, address bus, and control bus. The communication bus 104 may comprise any known bus architecture according to promulgated standards. These bus architectures include, for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, IEEE P1394, Universal Serial Bus (USB), Access.bus, Apple Desktop Bus (ADB), Concentration Highway Interface (CHI), Fire Wire, Geo Port, or Small Computer Systems Interface (SCSI).

Computer system 100 includes a main memory 106 and may also include a secondary memory 108. The main memory 106 provides storage of instructions and data for programs executing on the processing system 102. The main memory 106 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), and ferroelectric random access memory (FRAM).

The secondary memory 108 provides storage of instructions and data that are loaded into the main memory 106. The secondary memory 108 may be read-only memory or read/write memory and may include semiconductor based memory and/or non-semiconductor based memory. For example, in one embodiment of the computer system 100, the secondary memory 108 comprises a semiconductor based read-only memory (ROM).

The secondary memory 108 may include, for example, a hard disk drive 110 and/or a removable storage drive 112. The removable storage drive 112 represents various non-semiconductor based memories, including but not limited to a floppy disk drive, a magnetic tape drive, an optical disk drive, etc. The removable storage drive 112 reads from and/or writes to a removable storage unit (not shown), such as a magnetic tape, floppy disk, hard disk, laser disk, compact disc, digital versatile disk, etc., in a well-known manner. As will be appreciated, the removable storage unit (not shown) includes a computer usable storage medium having stored therein computer software and/or data.

In alternative embodiments, secondary memory 108 may include other similar means for allowing computer programs or other instructions to be loaded into the computer system 100. Such means may include, for example, a removable storage unit (not shown) and an interface 120. Examples of such include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage units and interfaces, which allow software and data to be transferred from the removable storage unit to the computer system 100.

The computer system 100 further includes a display system 124 for connecting to a display device 126. The display system 124 may comprise a video display adapter having all of the components for driving the display device, including video random access memory (VRAM), buffer, and graphics engine as desired. The display device 126 may comprise a cathode ray-tube (CRT) type display such as a monitor or television, or may comprise alternative display technologies such as a liquid-crystal display (LCD), a light-emitting diode (LED) display, or a gas or plasma display.

The computer system 100 further includes an input/output (I/O) system 130 for connecting to one or more I/O devices 132-134, and to a wireless modem 136. The input/output system 130 may comprise one or more controllers or adapters for providing interface functions between one or more of I/O devices 132-134 and/or the wireless modem 136. For example, input/output system 130 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), digital versatile disc (DVD), video capture device, touch screen, stylus, electroacoustic transducer, microphone, speaker, etc.

In one embodiment, the interface functions for the wireless modem 136 are built into the wireless modem 136 itself. Thus, in this embodiment, the wireless modem 136 is coupled directly with the communication bus 104.

Input/output system 130 and the wireless modem 136, plus one or more of the I/O devices 132-134, provide a communications interface, which allows software and data to be transferred between computer system 100 and external devices, networks or information sources. Examples of this communications interface include the wireless modem 136, a network interface (such as an Ethernet card), a communications port, a PCMCIA slot and card, etc. This communications interface preferably implements industry promulgated architecture standards, such as Recommended Standard 232 (RS-232) promulgated by the Electrical Industries Association, Infrared Data Association (IrDA) standards, Ethernet IEEE 802 standards (e.g., IEEE 802.11 for wireless networks), Fibre Channel, digital subscriber line (DSL), asymmetric digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Data Over Cable Service Interface Specification (DOCSIS), and so on.

Software and data transferred via this communications interface are in the form of signals, which can be electronic, electromagnetic, optical or other signals capable of being received by this communications interface. For example, software and data transferred via the wireless modem 136 are in the form of signals 142, which can be RF signals using an air interface selected from a group that includes but is not limited to CDPD, GPRS, Ricochet, GSM, CDMA, W-CDMA, and UMTS. These signals 142 are provided to the wireless modem 136 via an RF channel 140. Alternative channels for additional communications interfaces include wire or cable, fiber optics, a phone line, infrared interface (IR) or other communications channels.

Computer programming instructions (also known as computer programs, software or code) are stored in the main memory 106 and/or the secondary memory 108. Such computer programs, when executed, enable the computer system 100 to perform the features of the present invention as discussed herein. In particular, the computer programs, when executed, enable the processing system 102 to perform the features and functions of the present invention. Accordingly, such computer programs represent controllers of the computer system 100.

As used herein, the term "computer readable medium" refers to any media used to provide one or more sequences of one or more instructions to the processing system 102 for execution. Non-limiting examples of these media include the removable storage units discussed previously, a hard disk installed in hard disk drive 110, a ROM installed in the computer system 100, and signals 142. These computer readable media are means for providing programming instructions to the computer system 100.

It should be appreciated that modification or reconfiguration of computer system 100 of FIG. 1 by one having ordinary skill in the art would not depart from the scope or the spirit of the present invention. Thus, the systems and methods described herein are equally applicable to PDAs, laptops or other handheld computers, non-portable computers, wireless modems in general, or any computer system that includes a wireless modem or a port for interfacing with a wireless modem card.

Figure 2:
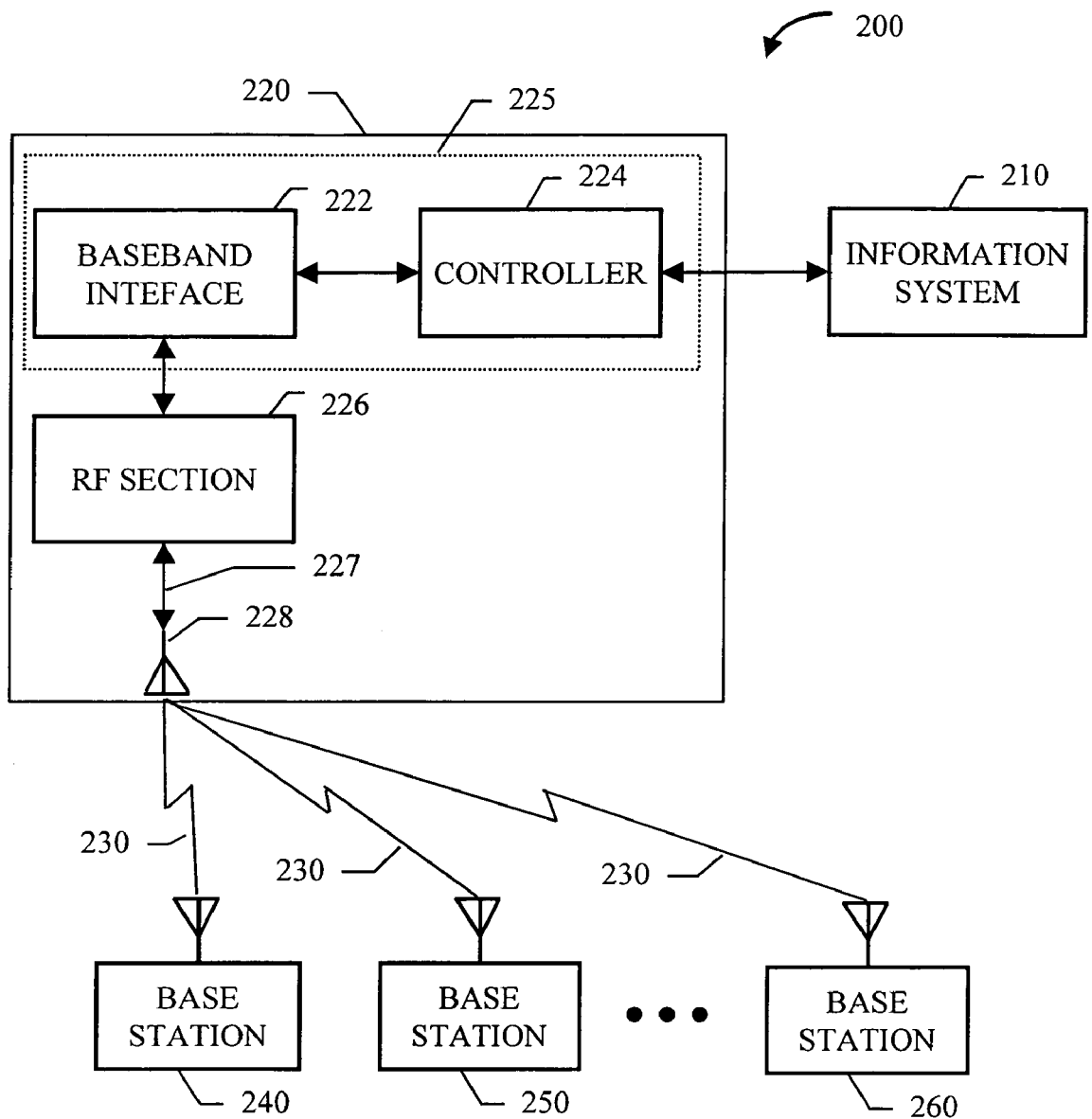
FIG. 2 is a block diagram illustrating a wireless modem communications system according to one embodiment.

FIG. 2 is a block diagram illustrating a wireless modem communications system according to one embodiment. Referring now to FIG. 2, a wireless communications system 200 includes a wireless modem 220 coupled with a computer-based information handling system 210. For example, in one embodiment, the computer-based information handling system 210 and the wireless modem 220 comprise the computer system 100 from FIG. 1.

The wireless modem 220 is adapted for reconfiguration for communicating information via a plurality of wireless transmission media 230. In one embodiment, the wireless modem 220 includes a baseband section 225, an RF section 226, and one or more antennas 228 for transmitting and receiving information via the wireless transmission media 230.

In one embodiment, the baseband section 225 comprises a baseband interface 224, a controller 222 and a device interface (not shown) for interfacing with a bus of the computer-based information handling system 210. The baseband interface 224 converts baseband signals received from the RF section 226 to digital signals that are sent to the controller 222. The controller 222 decodes the information in accordance with the appropriate communication protocol. In addition, digital information to be transmitted by the wireless modem 220 is first encoded by the controller 222 and then sent to the baseband interface 224, where it is converted into a baseband signal and sent to the RF section 226.

As is understood in the art, the controller 222 and the baseband interface 224 can be integrated into one device, or separated, including, for example, by placing the controller 222 in the information system 210. The controller 222 manages the transfer of information between the information system 210 and the RF section 226. The controller 222 is responsible for tuning the RF section 226 to the proper RF frequency for communication in a particular wireless communication network. The controller 222 performs this responsibility using the reconfiguration methods described herein.

Thus, the wireless modem 220 is capable of communicating via the wireless transmission media 230 with a plurality of remotely disposed base stations 240, 250, 260. These base stations 240, 250, 260 each include a wireless communications interface, which implements a specific air interface, and a network connection. For example, in one embodiment, the base station 240 comprises a CDPD base station, the base station 250 comprises a GPRS base station, and the base station 260 comprises a Ricochet base station. Alternatively, one or more of the base stations 240, 250, 260 comprise a base station capable of communicating using multiple air interfaces and/or multiple networks.

Figure 3A:
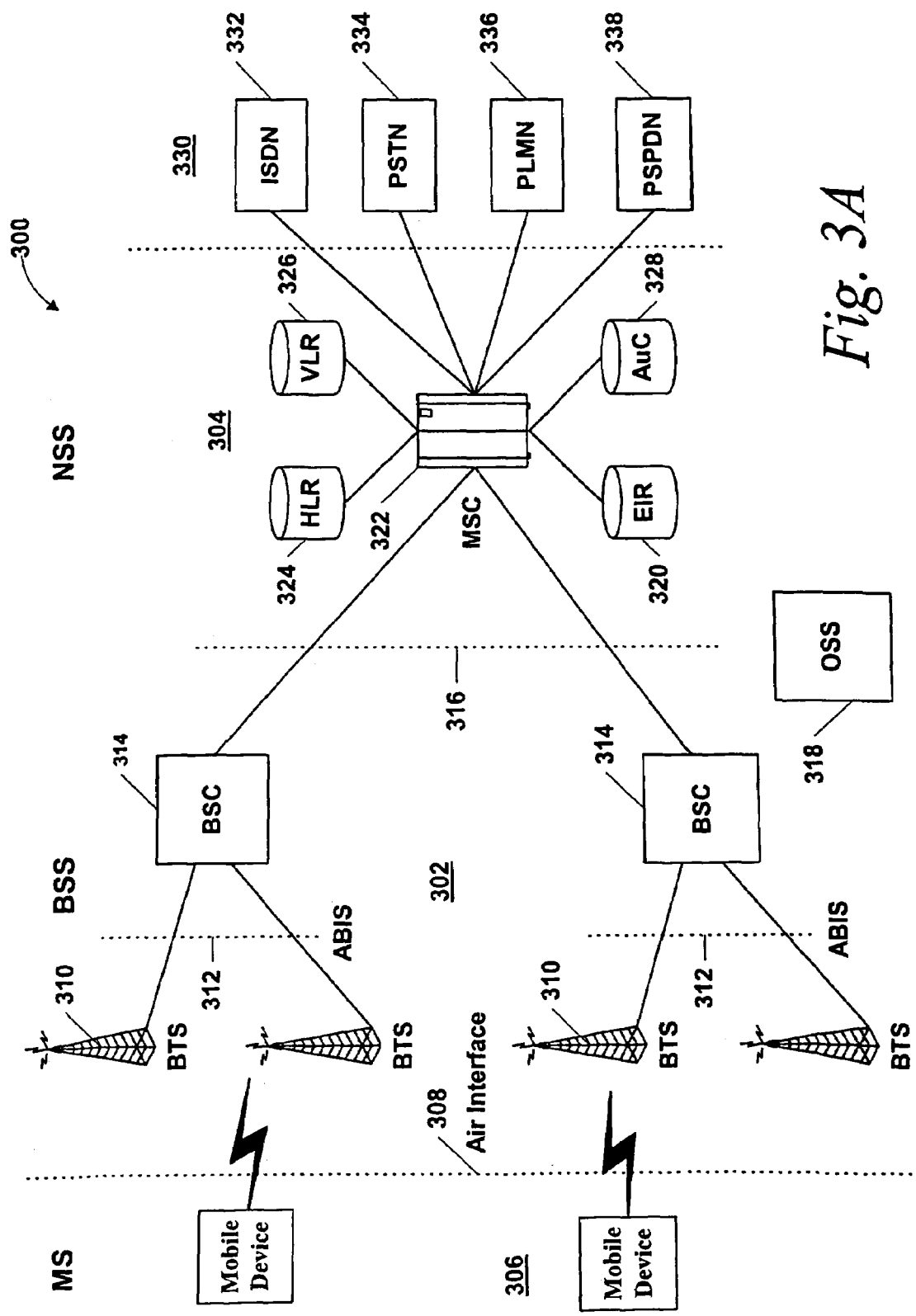
FIG. 3B is a perspective illustration of an extended PCMCIA wireless RF modem that is designed to be plugged into a PCMCIA slot connector within a host computer system according to one embodiment.
FIG. 3C is a perspective illustration showing the wireless RF modem fully inserted into the PCMCIA slot within the host computer system according to one embodiment.

FIG. 3A is a diagram illustrating an exemplary W-WAN 300 wireless communication network. FIG. 3A is provided in order to illustrate how a mobile device communicates within a W-WAN. The basic communication principles that apply to W-WAN 300 will also, however, apply to a W-LAN or to a W-PAN.

W-WAN 300 is divided into four interconnected components or subsystems: Mobile Station (MS) 306, Base Station Subsystem (BSS) 302, Network Switching Subsystem (NSS) 304, and Operation Support Subsystem (OSS) 318. Generally, MS 306 is the mobile device carried by the user; however, MS 306 may be any multi-mode wireless communication device using a wireless modem, such as the PDA discussed above. BSS 302 interfaces with multiple mobiles to manage the radio transmission paths between MS 306 and NSS 304. In turn, NSS 304 manages network-switching functions and facilitates communications with other networks such as the PSTN and the ISDN. OSS 318 facilitates operation and maintenance of the network.

MS 306 communicates with BSS 302 across a standardized radio air interface 308. BSS 302 is composed of multiple base transceiver stations (BTS) 310 and base station controllers (BSC) 314. BTS 310 is usually in the center of a cell and consists of one or more radio transceivers, each equipped with an antenna. It establishes radio links and handles radio communications over the air interface with MS 306 within the cell. The transmitting power of the transceiver defines the size of the cell. Each BSC 314 manages multiple transceivers. The total number of transceivers assigned to a particular controller may number in the hundreds. The transceiver-controller communication is over a standardized "Abis" interface 312. BSC 314 allocates and manages radio channels and controls handovers of calls between its transceivers.

BSC 314, in turn, communicates with NSS 304 over a standardized interface 316. For example, in a GSM network, the interface uses an SS7 protocol and allows use of base stations and switching equipment made by different manufacturers. A Mobile Switching Center (MSC) 322 is the primary component of NSS 304. MSC 322 manages communications between mobile subscribers and between mobile subscribers and public networks 330. Examples of public networks 330 include: Integrated Services Digital Network (ISDN) 332, Public Switched Telephone Network (PSTN) 334, Public Land Mobile Network (PLMN) 336, and Packet Switched Public Data Network (PSPDN) 338.

MSC 322 typically will interface with several databases to manage communication and switching functions. For example, MSC 322 may interface with Home Location Register (HLR) 324 that contains details on each subscriber residing within the area served by MSC 322. There may also be a Visitor Location Register (VLR) 326 that temporarily stores data about roaming subscribers within a coverage area of a particular MSC 322. An Equipment Identity Register (EIR) 320 that contains a list of mobile equipment may also be included. Further, equipment that has been reported as lost or stolen may be stored on a separate list of invalid equipment that allows identification of subscribers attempting to use such equipment. Finally, there may be an Authorization Center (AuC) 328 that stores authentication and encryption data and parameters that verify a subscriber's identity.

Referring once again to FIG. 2, in one embodiment, the baseband section 225 includes a coder/decoder (CODEC), one or more Field-Programmable Gate Arrays (FPGA) and one or more processor cores. The CODEC includes an Analog-to-Digital Converter (ADC) for converting baseband signals received from the RF section 226 to digital information signals, and a Digital-to-Analog Converter (DAC) for converting digital information signals to baseband signals that are sent to the RF section 226. The one or more processor cores may comprise one or more DSPs configured to interpret the information received, communicate with the information system 210, and control the operation of the RF section 226. In one embodiment, these one or more DSPs use a standard Harvard architecture for greater memory bandwidth and more predictable bandwidth.

In another embodiment, the baseband section 224 includes a processing system and a memory, such as those described in connection with FIG. 1.

In one embodiment, the RF section 226 comprises a wideband transceiver. The transceiver is typically split into a transmit and receive path. In one embodiment, the transmit path includes one or more mixers that modulate one or more RF carriers with the baseband signals received from the controller 224 in order to generate an RF transmit signal. The one or more RF carriers are sinusoidal carrier signal frequencies specified by each particular air interface. The transmit path of the transceiver may also include a Power Amplifier (PA). PAs are typically key components in any high frequency RF transmitter design. This is because RF transmitters typically require high output power to compensate for path losses and to achieve satisfactory signal levels at the one or more antennas 228.

The receive path of the transceiver comprises one or more mixers that demodulate a received RF signal with one or more RF carriers in order to remove the carrier and extract the baseband information signal. The receive path may also include a low noise amplifier (LNA) and one or more filters. The RF signals received by the one or more antennas 228 are typically at very low signal levels, thus an LNA is frequently a necessary component.

In one embodiment, the receive and transmit paths are duplexed over one or more common connections 227 to the one or more antennas 228. The impedance of the one or more connections 227 should match the impedance of the one or more antennas 228 for the one or more antennas 228 to transmit each RF transmit signal efficiently. If the impedance is not matched, then RF energy will be reflected back in the opposite direction when a transmit or receive RF signal reaches a connection 227. Moreover, the one or more common connections 227 are often unbalanced connections. But the one or more antennas 228 typically require balanced signals. Thus, one or more balun and matching networks may be included in order to match the impedance between the one or more common connections 227 and the one or more antennas 228, and to balance each RF transmit signal received from transceiver through the one or more unbalanced connections 227.

In one embodiment, the wireless modem 220 does not include the RF section 226 or the one or more antennas 228. For example, the wireless modem 220 may be a single integrated circuit designed to be coupled with a separately produced RF front end before connection with an information system.

Figure 3B:
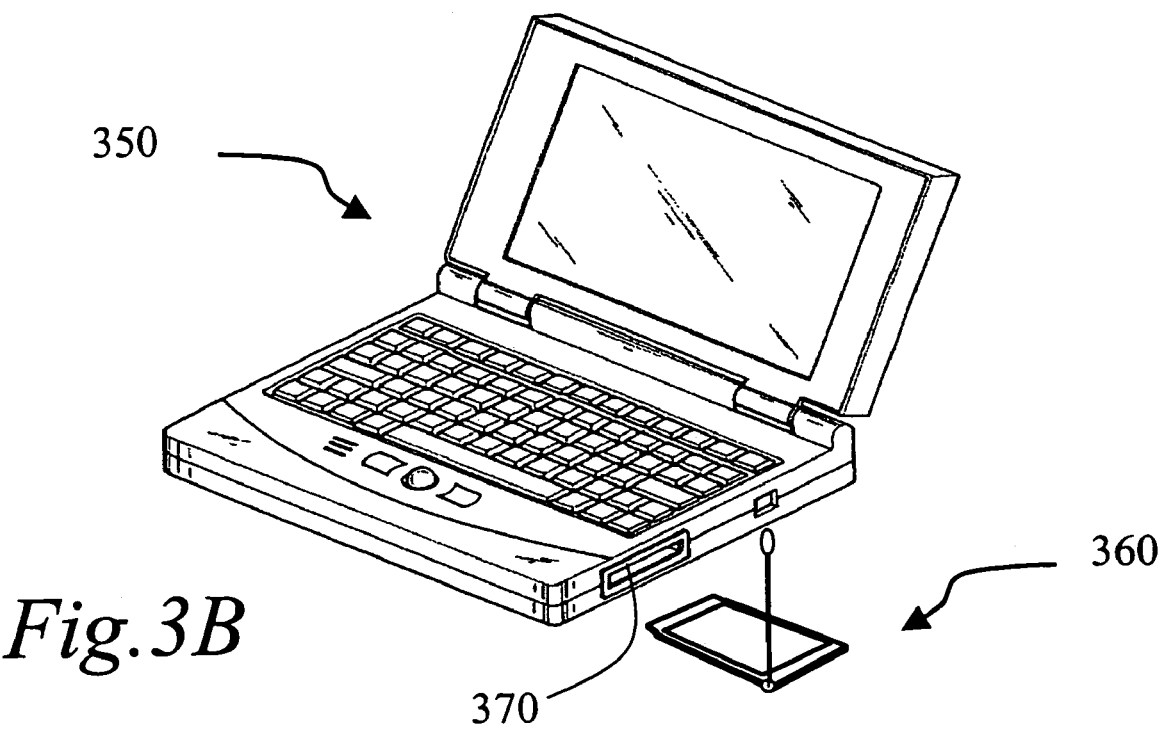
Figure 3C:
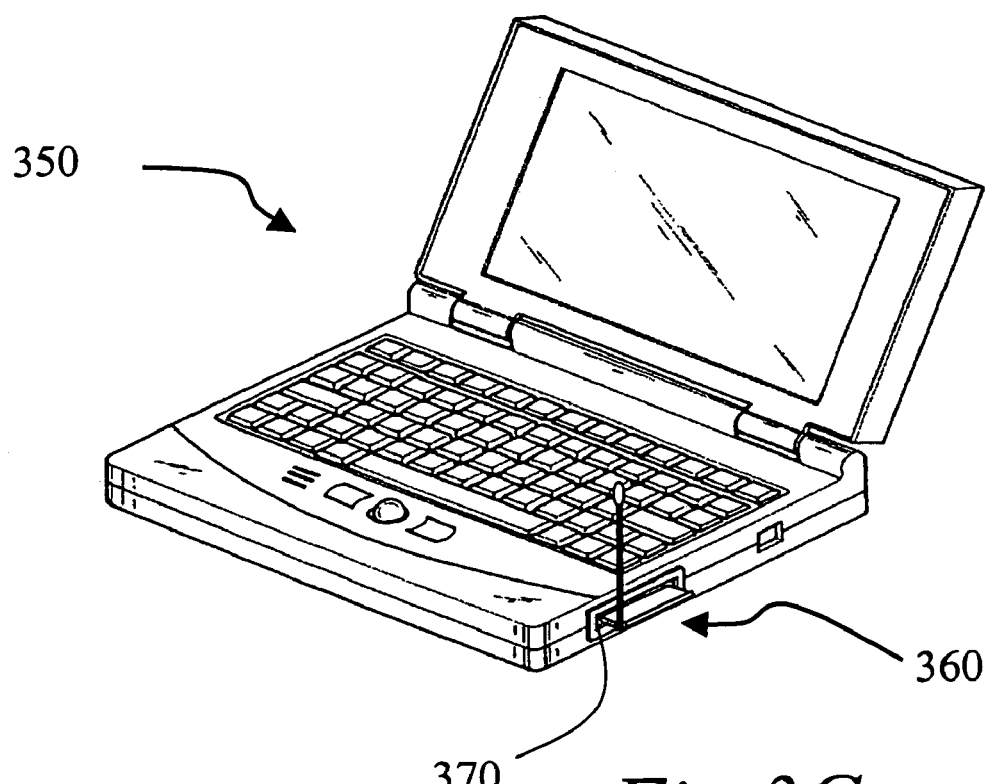

Additionally, in one embodiment, the wireless modem 220 is removably coupled with the computer-based information handling system. For example, FIG. 3B is a perspective illustration of an extended PCMCIA wireless RF modem that is designed to be plugged into a PCMCIA slot connector within a host computer system according to one embodiment, and FIG. 3C is a perspective illustration showing the wireless RF modem fully inserted into the PCMCIA slot within the host computer system according to one embodiment. Referring now to FIGS. 3B and 3C, the wireless RF Modem 360 plugs into the PCMCIA slot connector 370 within the host computer system 350, which is a laptop. The wireless RF modem 360 is shown with an external attached antenna. However, in an alternative embodiment, the antenna is integrated within a plastic enclosure and is mounted within the extended portion of the wireless RF modem 360.

Figure 4:
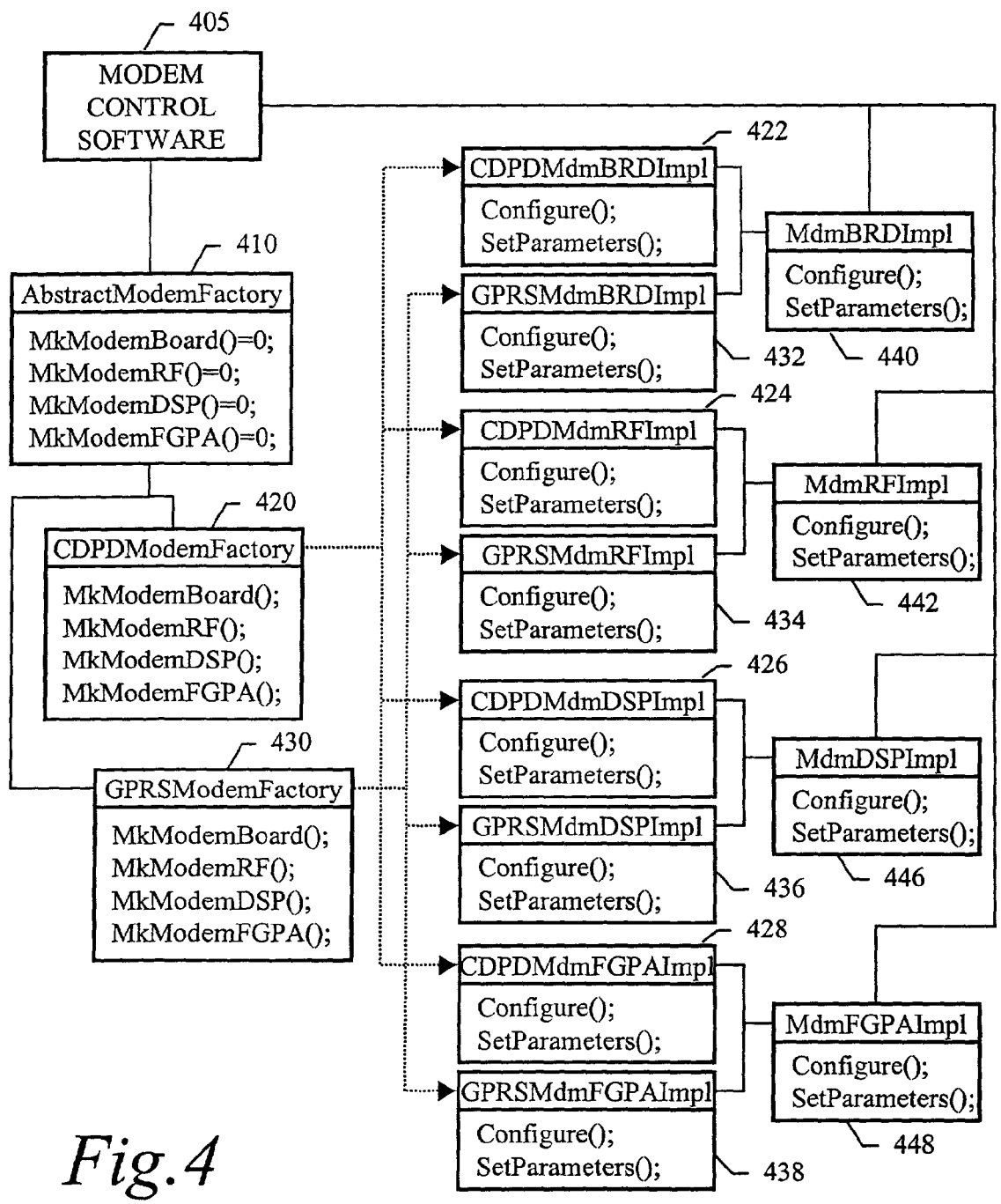
FIG. 4 is a block diagram illustrating a software architecture for a software reconfigurable modem according to one embodiment.

FIG. 4 is a block diagram illustrating a software architecture for a software reconfigurable modem according to one embodiment. Referring now to FIG. 4, modem control software 405 includes an abstract modem factory class 410 and abstract modem configuration classes 440, 442, 446, 448. There is a concrete subclass of the abstract modem factory class 410 for each air interface. For example, air interface subclasses 420, 430 create air interface objects 422, 424, 426, 428 and 432, 434, 436, 438. Because a selected one of the air interface subclasses 420, 430 can be created at run time, there is no hard coding to any specific modem type, thus making exchanging modem types easy.

Although the software architecture illustrated in FIG. 4 includes only two air interface subclasses 420, 430, those skilled in the relevant art(s) will understand that any number of air interface subclasses may be included. Moreover, in an alternative embodiment, each air interface subclass creates only a single air interface object, which is solely capable of configuring the hardware of the wireless modem. Thus, in one embodiment, there is only one abstract modem configuration class.

Once the air interface objects are created for a particular modem type (e.g. air interface objects 422, 424, 426, 428 are created for CDPD), these air interface objects are executing using the interfaces defined by the abstract modem configuration classes 440, 442, 446, 448. For example, in the illustrated embodiment, the interfaces are the Configure and SetParameters member functions of the abstract modem configuration classes 440, 442, 446, 448. The execution of the air interface objects configures the wireless modem hardware to function as the particular modem type. This configuration can be accomplished by tuning the RF section 226 to the proper RF frequency for communication in a particular wireless communication network and/or by modifying control pathways within the baseband section 225.

The abstract modem factory architecture isolates the modem control software from the implementation code specific to modem type. It does this by utilizing the polymorphism characteristic of object oriented methodology and dynamic binding at run time. Thus, the abstract modem factory architecture provides an interface for creating modem type without specifying their concrete classes. The concrete classes remain responsible for creating the complete set of software modules specific to each modem type configuration.

Figure 5:
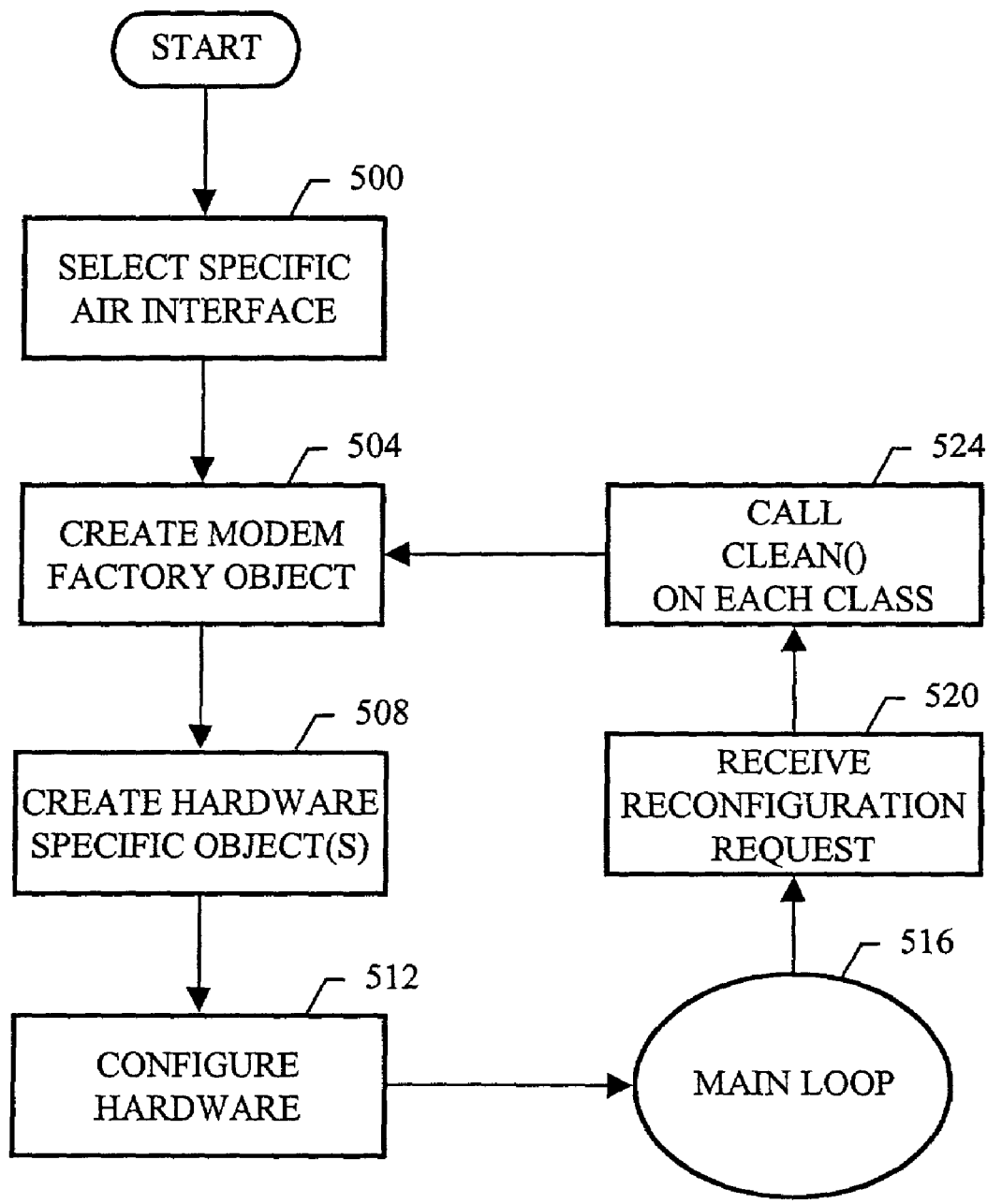
FIG. 5 is a flowchart depicting a process by which a modem type is initialized and reconfigured according to one embodiment.

FIG. 5 is a flowchart depicting a process by which a modem type is initialized and reconfigured according to one embodiment. The process depicted in FIG. 5 may be executed in a processor system included within a wireless modem, or it may be executed in a processor system configured to connect with a wireless modem. Referring now to FIG. 5, the process begins with step 500, in which a specific air interface is selected. Because step 500 represents initialization of modem type, typically the selected air interface is a default air interface.

The default air interface is stored in a memory, either internal or external to the wireless modem. In one embodiment, the default air interface is stored as an air interface specification, such as CDPD, GPRS or Ricochet, which may be user programmed or programmed by a manufacturer. In an alternative embodiment, the default air interface is stored as a set of instructions for determining the selected air interface. For example, these instructions may include instructions for prompting a user to select an air interface from a set of available air interfaces. Alternatively, these instructions may include instructions for scanning received RF signals for available air interfaces and selecting a preferred air interface from those available. Additionally, these instructions may include instructions for requesting the default air interface via a wire-based network connection, such as a TCP/IP connection.

Following step 500, a modem factory object is created for the selected air interface using an abstract modem factory class in step 504. Then, in step 508, one or more hardware specific configuration objects are created for the selected air interface using the created modem factory object. Next, each hardware specific configuration object is called, using the one or more interfaces defined by one or more abstract modem configuration classes, to configure the wireless modem hardware for the selected air interface in step 512. After step 512, the process enters a main loop 516 where the wireless modem may be used to transmit and receive data over the selected air interface.

A specific example of steps 504, 508, 512 is as follows: the selected air interface is Ricochet; an instance of a Ricochet modem factory class is created in step 504 using the interface defined by the abstract modem factory; this instance of the Ricochet modem factory class creates a Ricochet hardware configuration object in step 508; the wireless modem hardware is configured in step 512 to transmit and receive using Ricochet by calling the Configure member function of the Ricochet hardware configuration object.

The main loop 516 is left when an interrupt occurs. The interrupt is represented by step 520, in which a reconfiguration request is received. The reconfiguration request may be from a user, a service provider or from a set of instructions running in the background during the main loop 516. For example, these instructions may include instructions for periodically scanning received RF signals for available air interfaces and selecting a preferred air interface from those available. The preference for an air interface is based upon a number of factors, including cost of a particular air interface service and data rate requirements for a current or imminent user activity.

In any event, the reconfiguration request includes a new selected air interface. Following step 520, the current modem factory object and its one or more hardware specific configuration objects are cleaned and deleted in step 524. Then the process returns to step 504, and a new air interface configuration is created.

The process depicted in FIG. 5 may also be modified to save storage space. For example, in one embodiment, the abstract modem factory class is designed to handle a large number of specific air interfaces, but a particular user may not wish to store or pay for all the libraries necessary to implement each of those air interfaces. In this case, additional steps are added between step 520 and 524 to handle loading of additional libraries as needed.

For example, in one embodiment, step 520 is followed by a memory check to see if a library containing definitions for the selected air interface subclass is available. If so, the process proceeds to step 524. If not, the necessary library is requested, either via the current air interface or via an alternate network connection, such as a wire-based TCP/IP connection. If the necessary library is successfully downloaded, the process proceeds to step 524. If not, the process returns to the main loop 516, preferably with a message to the user regarding the failure to switch modem types.

As will be appreciated by those skilled in the relevant art(s), the software architecture and methods described herein create extensive flexibility for wireless modems. A user may delete and download configuration software for specific air interfaces as needed, or download upgrades for specific configuration software. A service provider may upload configuration software for specific air interfaces. A manufacturer may obtain economies of scale by manufacturing a single hardware design for a wireless modem and then load configuration software for one or more specific air interfaces and configure the modem according to specific customer needs before shipping.

While various embodiments of the invention have been described above, it should be understood that they have been presented by way of example only, and not limitation. Thus, the breadth and scope of the invention should be ascertained with reference to the issued claims.

What is claimed is:

1. A method for configuring a wireless modem having hardware that is capable of transmitting or receiving data via a plurality of air interface technologies, comprising the steps of:
   (a) selecting a specific air interface from a set of at least two air interfaces;
   (b) creating a modem factory object for the selected air interface using an abstract modem factory class;
   (c) generating a hardware configuration object for the selected air interface using the modem factory object; and
   (d) configuring wireless modem hardware using the hardware configuration object via an interface defined by an abstract modem configuration class.

2. The method of claim 1, wherein the selecting step is dependent upon an input from a user.

3. The method of claim 1, wherein the generating step comprises generating a plurality of hardware configuration objects for the selected air interface using the modem factory object, and wherein the configuring step comprises configuring the wireless modem hardware using the plurality of hardware configuration objects via interfaces defined by a plurality of abstract modem configuration classes.

4. The method of claim 1, further comprising:
   (e) checking a memory for a library corresponding to the selected air interface;
   (f) requesting the library via a network if the library is not found in the checking step; and
   (g) skipping the steps of creating, generating and configuring, if the step of requesting does not result in successful retrieval of the library.

5. A computer readable storage medium having stored thereon a computer program product for causing one or more microprocessors to perform the steps for configuring wireless modem hardware, the computer program product comprising:
   computer code for selecting a specific air interface from a set of at least two air interfaces;
   computer code for creating a modem factory object for the selected air interface using an abstract modem factory class;
   computer code for generating a hardware configuration object for the selected air interface using the modem factory object; and
   computer code for configuring wireless modem hardware using the hardware configuration object via an interface defined by an abstract modem configuration class.

6. The computer readable storage medium of claim 5, wherein the computer code for selecting is dependent upon an input from a user.

7. The computer readable storage medium of claim 5, wherein the computer code for generating further comprises computer code for generating a plurality of hardware configuration objects for the selected air interface using the modem factory object, and wherein the computer code for configuring further comprises computer code for configuring the wireless modem hardware using the plurality of hardware configuration objects via interfaces defined by a plurality of abstract modem configuration classes.

8. The computer readable storage medium of claim 5, further comprising
   computer code for checking a memory for a library corresponding to the selected air interface;
   computer code for requesting the library via a network if the library is not found when checking the memory;
   computer code for skipping creating, generating and configuring, if requesting does not result in successful retrieval of the library.

9. A computer system comprising:
   (a) an input/output system;
   (b) a wireless modem coupled with the input/output system; and
   (c) a processing system coupled with the wireless modem and configured to:
      (i) select a specific air interface from a set of at least two air interfaces;
      (ii) create a modem factory object for the selected air interface using an abstract modem factory class;
      (iii) generate a hardware configuration object for the selected air interface using the modem factory object; and
      (iv) configure wireless modem hardware using the hardware configuration object via an interface defined by an abstract modem configuration class.

10. The computer system of claim 9, wherein the processing system is further configured to select the specific air interface based upon an input from a user.

11. The computer system of claim 9, wherein the processing system is further configured to:
   (v) generate a plurality of hardware configuration objects for the selected air interface using the modem factory object; and
   (vi) configure the wireless modem hardware using the plurality of hardware configuration objects via interfaces defined by a plurality of abstract modem configuration classes.

12. The computer system of claim 9, wherein the processing system is further configured to:
   (v) check a memory for a library corresponding to the selected air interface;
   (vi) request the library via a network if the library is not found in the memory; and
   (vii) fail to create the modem factory object, generate the hardware configuration object, or configure the wireless modem hardware, if the library is not successfully retrieved.

13. A method for configuring a wireless modem having hardware that is capable of transmitting or receiving data via a plurality of air interface technologies, comprising:
   (a) step of selecting a specific air interface from a set of at least two air interfaces;

(b) step of creating a modem factory object for the selected air interface using an abstract modem factory class;
(c) step of generating a hardware configuration object for the selected air interface using the modem factory object; and
(d) step of configuring wireless modem hardware using the hardware configuration object via an interface defined by an abstract modem configuration class.

14. The method of claim 13, wherein the step of selecting is dependent upon an input from a user.

15. The method of claim 13, wherein the step of generating comprises step of generating a plurality of hardware configuration objects for the selected air interface using the modem factory object, and wherein the step of configuring comprises step of configuring the wireless modem hardware using the plurality of hardware configuration objects via interfaces defined by a plurality of abstract modem configuration classes.

16. The method of claim 13, further comprising:
(e) step of checking a memory for a library corresponding to the selected air interface;
(f) step of requesting the library via a network if the library is not found in the memory; and
(g) step of skipping the steps of creating, generating and configuring, if the step of requesting does not result in successful retrieval of the library.

* * * * *